US012376518B2

(12) United States Patent
Elfner et al.

(10) Patent No.: US 12,376,518 B2
(45) Date of Patent: Aug. 5, 2025

(54) BLADE FOR A MOWING UNIT FOR A LAWNMOWER AND/OR A MOTOR SCYTHE, MOWING UNIT FOR A LAWNMOWER AND/OR A MOTOR SCYTHE, AND LAWNMOWER AND/OR MOTOR SCYTHE

(71) Applicant: Andreas Stihl AG & Co. KG, Waiblingen (DE)

(72) Inventors: Joerg Elfner, Ammerbuch (DE); Simon Schulte Strotmes, Waiblingen (DE); Markus Gassner, Koessen (AT); Marko Fiebig, Langkampfen (AT); Philip Wolf, Ebbs (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 820 days.

(21) Appl. No.: 17/454,700

(22) Filed: Nov. 12, 2021

(65) Prior Publication Data

US 2022/0151148 A1    May 19, 2022

(30) Foreign Application Priority Data

Nov. 13, 2020    (EP) .................................... 20207408

(51) Int. Cl.
*A01D 34/73*    (2006.01)
*A01D 45/10*    (2006.01)
A01D 101/00    (2006.01)

(52) U.S. Cl.
CPC ........ *A01D 34/733* (2013.01); *A01D 2101/00* (2013.01)

(58) Field of Classification Search
CPC .. A01D 34/733; A01D 34/736; A01D 34/404; A01D 34/68; A01D 34/73; A01D 34/664
See application file for complete search history.

(56) References Cited

U.S. PATENT DOCUMENTS 3,604,189 A    9/1971  Harer
5,452,569 A *  9/1995  Anderson ............... A01D 34/73
                                                        56/295

(Continued)

FOREIGN PATENT DOCUMENTS

DE            600 13 614 T2    9/2005
DE       20 2015 009 764 U1    3/2020

(Continued)

OTHER PUBLICATIONS

German-language Extended European Search Report issued in European Application No. 20207408.4 dated May 10, 2021 (eight (8) pages).

*Primary Examiner* — Joseph M Rocca
*Assistant Examiner* — Robert E Pezzuto
(74) *Attorney, Agent, or Firm* — Crowell & Moring LLP

(57) ABSTRACT

A blade for a mowing unit for a lawnmower and/or a motor scythe is substantially parallelogram-shaped. The blade has a slot, wherein the slot is designed to receive a blade-holding element of the mowing unit such that the blade can rotate about the blade-holding element and move in translation relative to the blade-holding element for one cutting position of the blade defined by one end of the slot having one cutting orientation of the blade and another cutting position of the blade defined by another end of the slot having another cutting orientation of the blade. A line segment delimited by the ends of the slot does run non-parallel to sides of the parallelogram, and the parallelogram has an obtuse internal angle.

20 Claims, 4 Drawing Sheets

(56) References Cited

U.S. PATENT DOCUMENTS

| | | | |
|---|---|---|---|
| 5,916,111 A | | 6/1999 | Colens |
| D663,595 S | * | 7/2012 | Nikkel .............................. D8/20 |
| 9,480,201 B2 | | 11/2016 | Maruyama et al. |
| 2012/0137648 A1 | * | 6/2012 | Nikkel ................. A01D 34/733 56/295 |
| 2013/0291506 A1 | | 11/2013 | Johnson et al. |
| 2018/0103583 A1 | | 4/2018 | Stridh |

FOREIGN PATENT DOCUMENTS

| | | |
|---|---|---|
| EP | 0 603 086 A1 | 6/1994 |
| EP | 2 625 947 A1 | 8/2013 |
| JP | 57-173525 U | 11/1982 |
| JP | 10-210839 A | 8/1998 |
| WO | WO 96/24242 A1 | 8/1996 |
| WO | WO 2016/150503 A1 | 9/2016 |

\* cited by examiner

BLADE FOR A MOWING UNIT FOR A LAWNMOWER AND/OR A MOTOR SCYTHE, MOWING UNIT FOR A LAWNMOWER AND/OR A MOTOR SCYTHE, AND LAWNMOWER AND/OR MOTOR SCYTHE

CROSS REFERENCE TO RELATED APPLICATION

This application claims priority under 35 U.S.C. § 119 from European Patent Application No. 20207408.4, filed Nov. 13, 2020, the entire disclosure of which is herein expressly incorporated by reference.

BACKGROUND AND SUMMARY OF THE INVENTION

The invention relates to a blade for a mowing unit for a lawnmower and/or a motor scythe, to a mowing unit for a lawnmower and/or a motor scythe having at least one such blade, and to a lawnmower and/or a motor scythe having such a mowing unit.

The invention is based on the problem of providing a blade for a mowing unit for a lawnmower and/or motor scythe, of providing a mowing unit for a lawnmower and/or a motor scythe having at least one such blade, and of providing a lawnmower and/or a motor scythe having one such mowing unit, this and/or these having respectively improved properties.

The invention solves this problem by providing a blade, a mowing unit having such a blade, and/or a lawnmower or a motor scythe having such a mowing unit, in accordance with the independent claims. Advantageous developments of the invention are described in the dependent claims.

The blade according to the invention is designed or configured for an, in particular rotating, mowing unit for a lawnmower, in particular a robotic lawnmower, and/or a motor scythe. The blade, in particular a flat and/or an outer form of the blade, is substantially or approximately, in particular exactly, parallelogram-shaped. The blade, in particular the parallelogram, comprises or has a slot. The slot is designed or configured to receive a blade-holding element, in particular a blade-holding pin or bolt, of the mowing unit such that the blade can rotate about the blade-holding element and can move in translation with respect to the blade-holding element for one, in particular a first, cutting position of the blade defined by one, in particular a first, end of the slot having one, in particular a first, cutting orientation of the blade and another, in particular a second, cutting position of the blade defined by another, in particular a second, end of the blade having another, in particular a second, cutting orientation of the blade. A line segment delimited or defined by the ends of the slot does run non-parallel to sides of the parallelogram. The parallelogram has an obtuse internal angle.

This, in particular the rotation and the movement in translation, allows the blade to move away or yield upon meeting an obstacle or colliding with or striking an obstacle. This therefore makes it possible to reduce or even entirely avoid a risk of the blade being damaged, in particular breaking and/or being destroyed. This therefore allows a long lifetime of the blade and/or a high level of safety. In addition or alternatively, this, in particular the rotation and the movement in translation, makes it possible to change the cutting positions having the cutting orientations, in particular without it being necessary to release the blade from the mowing unit, in particular the holder of the blade.

In addition or alternatively, this allows, in particular the cutting positions and the cutting orientations allow, wear on the blade on, in particular the, different sides of the parallelogram. This therefore allows a long service life of the blade.

In addition or alternatively, this, in particular the parallelogram, allows symmetry, in particular point symmetry and/or twofold rotational symmetry, of the blade. This therefore makes it possible to keep an unbalance of the blade, in particular of the mowing unit, low or even to avoid it completely. In addition or alternatively, this allows a uniform cutting or mowing result, in particular independently of whether the blade is in, in particular has been moved in translation and rotated into, the one cutting position having the one cutting orientation or is in, or has been moved in translation and rotated into, the other cutting position having the other cutting orientation. In addition or alternatively, this, in particular the parallelogram, allows a uniform cutting or mowing circle, in particular a uniform diameter of the cutting circle, in particular independently of a direction of rotation of the blade.

In addition or alternatively, this allows, in particular the course of the line segment not parallel to the sides of the parallelogram and the obtuse internal angle of the parallelogram allow, an inclination or sweep of an, in particular cutting or mowing, side of the parallelogram toward the front or forward in a direction of rotation of the mowing unit, in particular under a process force, in particular air resistance and/or cutting resistance or mowing resistance. This therefore allows a good cutting angle and therefore a good cutting or mowing pattern or a good cutting or mowing result.

In particular, the blade can be designed to cut or mow grass. In particular, the blade can be designed to cut grass using what is known as the free cutting method without a counter-blade. In addition or alternatively, the blade can be a cutting or mowing blade and/or a knife blade. In addition or alternatively, the blade can be in one piece. In addition or alternatively, the blade can be flat or planar. In addition or alternatively, the blade can run, in particular primarily, in two dimensions or directions, in particular a radial direction and a direction of rotation, and be substantially parallelogram-shaped in these two dimensions.

Substantially parallelogram-shaped can mean the following: the parallelogram-shaped basic shape of the blade can be discernible. In addition or alternatively, the blade can have at least one rounded corner. In particular, a corner radius, in particular a value of the corner radius, of an, in particular respectively, rounded corner can be at most 10% (per cent), in particular at most 5%, of a length, in particular of a value of the length, of an, in particular short, side of the parallelogram. In addition or alternatively, opposite sides of the parallelogram can be substantially or approximately, in particular exactly, the same length. In particular, substantially the same length can mean that the opposite sides of the parallelogram can have a length deviation of at most 2.5%, in particular at most 1%. In addition or alternatively, opposite sides of the parallelogram can be substantially or approximately, in particular exactly, parallel. In particular, substantially parallel can mean that the opposite sides of the parallelogram can have an angular deviation of at most 2.5° (degrees), in particular at most 1°. In addition or alternatively, opposite internal angles, in particular values of the internal angles, of the parallelogram can be substantially or approximately, in particular exactly, the same. In particular, substantially the same can mean that the opposite internal angles of the parallelogram can have an angular deviation of at most 2.5°, in particular at most 1°.

The slot can be a guide slot and/or a longitudinal slot and/or an oblong hole. In addition or alternatively, the slot can have a length of at least 25% and/or at most 75%, in particular 50%, of a length of an, in particular long, side of the parallelogram. In addition or alternatively, the slot for receiving the blade-holding element can be designed to hold the blade, in particular in a movably mounted manner, by way of the blade-holding element. In addition or alternatively, the slot can have exactly, in particular the, two ends. In addition or alternatively, the ends can, in particular each, be rounded or round. Also in addition or alternatively, the slot can run in a plane defined by the parallelogram.

At one time, the blade can have been moved in translation, in particular and rotated, in particular either, into the one cutting position, in particular having the one cutting orientation, or into the other cutting position, in particular having the other cutting orientation. In addition or alternatively, the cutting position and the cutting orientations can, in particular each, be defined in a stable manner and/or by a centrifugal force brought about or caused by rotation of the mowing unit, in particular about a mowing-unit axis of rotation. In particular, the mowing-unit axis of rotation can be referred to as a mowing-unit overall axis of rotation.

The line segment can be a central line segment.

Not parallel can mean an angular deviation of at least 5°, in particular at least 10°.

The blade, in particular the parallelogram, does not need to be rectangular.

In one development of the invention, the blade comprises or has cutting edges on at least, in particular exactly, two opposite, in particular long, sides of the parallelogram. In particular, the slot, in particular for receiving the blade-holding element of the mowing unit, is designed such that the blade can cut or mow with one, in particular a first, of the cutting edges with the one cutting orientation and can cut or mow with another, in particular a second, of the cutting edges with the other cutting orientation. In other words, the ends in the blade are arranged for the blade to cut or mow with one, in particular a first, of the cutting edges with the one cutting orientation and to cut or mow with another, in particular a second, of the cutting edges with the other cutting orientation. In particular, the blade can have cutting edges on two short sides of the parallelogram. In addition or alternatively, the cutting edges can run substantially or approximately, in particular exactly, along the entire length of the, in particular respective, sides. In addition or alternatively, at one time, the blade can cut, in particular either, with the one cutting edge with the one cutting orientation or with the other cutting edge with the other cutting orientation.

The slot can be curved, in particular S-shaped or banana-shaped, or run in a curved, in particular S-shaped or banana-shaped, manner.

In one development of the invention, the slot is, in particular only, straight or runs, in particular only, in a straight manner. This makes it possible for the slot to be short, and/or makes it possible to minimize weakening, in particular material weakening, of the blade and/or, in particular therefore, allows a high strength of the blade.

In one development of the invention, the slot, in particular for receiving the blade-holding element of the mowing unit, is designed in such a way, or the ends are arranged in the blade in such a way, that, in particular during holding by the blade-holding element and rotation of the mowing unit, in particular about a mowing-unit axis of rotation, the cutting orientations of the blade have been rotated, in particular through substantially or approximately, in particular exactly, 180°, with respect to one another, in particular about the blade-holding element. This allows a particularly uniform, in particular good, cutting or mowing result and/or a particularly uniform cutting or mowing circle. In particular, substantially 180° can mean that the cutting orientations of the blade can deviate from 180° at most by 2.5°, in particular at most by 1°.

In one development of the invention, the line segment, in particular the slot, runs through a center of mass or center of gravity of the blade. This allows the blade, in particular under a centrifugal force brought about or caused by a rotation of the mowing unit, in particular about a mowing-unit axis of rotation, in particular either to move in translation in particular into the one cutting position, and to rotate into the one cutting orientation, or to move in translation in particular into the other cutting position, and to rotate into the other cutting orientation, or makes it possible to define the cutting orientations. In particular, the center of mass of the blade can coincide with an intersection point of diagonals of the parallelogram.

In one development of the invention, the line segment, in particular the slot, runs with point symmetry and/or twofold rotational symmetry in the blade. This allows an unbalance of the blade, in particular of the mowing unit, to be kept particularly low or even to be avoided completely and/or allows a particularly uniform cutting or mowing result and/or a particularly uniform cutting or mowing circle. In particular, the line segment, in particular the slot, can be arranged and run with point symmetry and/or twofold rotational symmetry in the blade. In addition or alternatively, the line segment, in particular the slot, can run with point symmetry and/or twofold rotational symmetry with regard to an intersection point of diagonals of the parallelogram.

In one development of the invention, the ends of the slot are each, in particular physically, closer to a respective corner of a minor diagonal of the parallelogram than to corners of a major diagonal of the parallelogram. In addition or alternatively, a minor-diagonal angle, in particular a value of the minor-diagonal angle, between the line segment and an, in particular the, minor diagonal of the parallelogram is smaller than a major-diagonal angle, in particular a value of the major-diagonal angle, between the line segment and an, in particular the, major diagonal of the parallelogram. In addition or alternatively, the line segment runs between an, in particular the, minor diagonal of the parallelogram and an, in particular the, major diagonal of the parallelogram. This makes it possible for the inclination of the, in particular cutting or mowing, side of the parallelogram toward the front or forward in a direction of rotation of the mowing unit to be optimal. This therefore allows a particularly good cutting angle and therefore a particularly good cutting or mowing pattern or a particularly good cutting or mowing result. In particular, the minor-diagonal angle and/or the major-diagonal angle can, in particular each, be an acute angle and/or the smallest angle. In particular, the minor-diagonal angle and/or the major-diagonal angle, in particular each, does/do not need to be a larger supplementary angle or complementary angle or adjacent angle. In addition or alternatively, between the minor diagonal and the major diagonal can mean in a region of an acute angle between the minor diagonal and the major diagonal.

In one development of the invention, immediately, adjacent sides of the parallelogram are different lengths. In particular, a short-orthogonal angle, in particular a value of the short-orthogonal angle, between the line segment and a short orthogonal orthogonal to short sides of the parallelogram is smaller than a long-orthogonal angle, in particular a value of the long-orthogonal angle, between the line segment and a long orthogonal orthogonal to long sides of the parallelogram. In particular, this makes it possible for the inclination of the, in particular cutting or mowing, side of the parallelogram toward the front or forward in a direction of rotation of the mowing unit to be optimal. This therefore allows a particularly good cutting angle and therefore a particularly good cutting or mowing pattern or a particularly good cutting or mowing result. In particular, the short-orthogonal angle and/or the long-orthogonal angle can, in particular each, be an acute angle and/or the smallest angle. In particular, the short-orthogonal angle and/or the long-orthogonal angle, in particular each, does/do not need to be a larger supplementary angle or complementary angle or adjacent angle.

In one development of the invention, long sides, where present, of the parallelogram, in particular each, have a length of at least 20 mm (millimetres) and/or at most 160 mm, in particular at most 80 mm, in particular 40 mm. In addition or alternatively, short sides, where present, of the parallelogram, in particular each, have a length of at least 10 mm and/or at most 80 mm, in particular at most 40 mm, in particular 20 mm. In addition or alternatively, the slot has a length of at least 7.5 mm and/or at most 30 mm, in particular 15 mm. In addition or alternatively, the obtuse internal angle, in particular a value of the internal angle, is at least 95° and/or at most 120°, in particular 100°. In addition or alternatively, an, in particular the, minor-diagonal angle, in particular a value of the minor-diagonal angle, between the line segment and an, in particular the, minor diagonal of the parallelogram is at least 10° and/or at most 40°, in particular 20°. In addition or alternatively, an, in particular the, major-diagonal angle, in particular a value of the major-diagonal angle, between the line segment and an, in particular the, major diagonal of the parallelogram is at least 15° and/or at most 75°, in particular 37.5°. In addition or alternatively, an, in particular the, short-orthogonal angle, in particular a value of the short-orthogonal angle, between the line segment and an, in particular the, short orthogonal orthogonal to short sides, where present, of the parallelogram is at least 2.5° and/or at most 10°, in particular 5°. In addition or alternatively, an, in particular the, long-orthogonal angle, in particular a value of the long-orthogonal angle, between the line segment and an, in particular the, long orthogonal orthogonal to long sides, where present, of the parallelogram is at least 70° and/or at most 85°, in particular 80°.

The mowing unit according to the invention is designed or configured for a lawnmower and/or a motor scythe. The mowing unit comprises or has at least one, in particular the, blade as mentioned or described above and, in particular only, one, in particular a single, blade-holding device. The blade-holding device comprises or has at least one, in particular the, blade-holding element for holding the blade, in particular in a movably mounted manner. The blade-holding device is designed or configured to rotate about an, in particular the and/or central, mowing-unit axis of rotation of the mowing unit.

In particular, the mowing unit can have a plurality of, in particular structurally identical, blades as mentioned above. The blade-holding device can have a plurality of blade-holding elements. In particular, the plurality of blades and the plurality of blade-holding elements can correspond to one another, in particular equate to one another.

The blade-holding element and the slot of the blade can be designed to receive the blade-holding element, in particular parallel to an element longitudinal axis of the blade-holding element. In particular, the element longitudinal axis may be not orthogonal, in particular parallel, with respect to the mowing-unit axis of rotation. In addition or alternatively, the element longitudinal axis may be not parallel, in particular orthogonal, with respect to a direction of rotation of the mowing unit, in particular of the blade-holding device, and/or with respect to a radial direction orthogonal to the direction of rotation and/or the mowing-unit axis of rotation, in particular starting from the mowing-unit axis of rotation.

The holder can be releasable, in particular non-destructively and/or without tools, in particular by a user.

The blade and the blade-holding device may be different.

The blade-holding device can have, in particular be, a blade or knife disc.

Upon, in particular as a result of, the rotation of the blade-holding device, in particular about the mowing-unit axis of rotation, the blade can project beyond an outer edge of the blade-holding device, in particular in a radial direction orthogonal to the mowing-unit axis of rotation, in particular starting from the mowing-unit axis of rotation, and/or run away from the element longitudinal axis in the radial direction.

The mowing unit, in particular the blade-holding device, can have an, in particular centrally arranged, shaft receptacle for receiving a rotary shaft, in particular in an axial direction that is not orthogonal, in particular parallel, with respect to the mowing-unit axis of rotation. In particular, the shaft receptacle can define the mowing-unit axis of rotation.

In one development of the invention, the blade-holding element is arranged in a spaced-apart or off-center manner with respect to the mowing-unit axis of rotation in an, in particular the, radial direction orthogonal to the mowing-unit axis of rotation, in particular starting from the mowing-unit axis of rotation. This makes it possible for the centrifugal force, in particular brought about or caused by the rotation of the mowing unit, in particular about the mowing-unit axis of rotation, to act on the blade.

In one development of the invention, the parallelogram is formed in such a way and the ends of the slot are arranged in the blade in such a way, in particular and the blade-holding element is arranged in such a way, that during holding by the blade-holding element and during rotation of the mowing unit, the mowing-unit axis of rotation has substantially or approximately, in particular exactly, equal spacings, in particular equal values of the spacings, from two respective remote corners, in particular of a short side, of the parallelogram in the one cutting position of the blade having the one cutting orientation of the blade and/or in the other cutting position of the blade having the other cutting orientation of the blade, in particular moved in translation and rotated by the centrifugal force. In particular, the spacings, in particular values of the spacings, are, in particular each, at least 80 mm and/or at most 640 mm, in particular at most 320 mm, in particular 140 mm. This allows a particularly uniform cutting or mowing circle. In particular, substantially equal spacings can mean that the spacings can have a deviation, in particular a length deviation, of at most 2.5%, in particular at most 1%.

In one development of the invention, the parallelogram is formed in such a way and the ends of the slot are arranged in the blade in such a way, in particular and the blade-holding element is arranged in such a way, that during holding by the blade-holding element and during rotation of the mowing unit, an, in particular long, side of the parallelogram runs substantially or approximately, in particular exactly, in an, in particular the, radial direction orthogonal to the mowing-unit axis of rotation, in particular starting from the mowing-unit axis of rotation, in the one cutting position of the blade having the one cutting orientation of the blade and/or in the other cutting position of the blade having the other cutting orientation of the blade, in particular moved in translation and rotated by the centrifugal force. This makes it possible for the inclination of the, in particular cutting or mowing, side of the parallelogram toward the front or forward in a direction of rotation of the mowing unit to be optimal. This therefore allows a particularly good cutting angle and therefore a particularly good cutting or mowing pattern or a particularly good cutting or mowing result. In particular, substantially in can mean that the side and the radial direction can have an angular deviation of at most 2.5°, in particular at most 1°.

The lawnmower according to the invention and/or the motor scythe according to the invention comprise/comprises or have/has, in particular each, an, in particular the, mowing unit as mentioned or described above.

In particular, the lawnmower can be an, in particular autonomous mobile, robotic lawnmower.

The motor scythe can be a brushcutter, grass trimmer and/or a lawn trimmer.

The lawnmower and/or the motor scythe can, in particular each, have an, in particular the, rotary shaft or hub or drive shaft. In particular, the rotary shaft can be designed to rotate about the mowing-unit axis of rotation.

The lawnmower and/or the motor scythe can, in particular each, have an, in particular electric, drive motor for driving the rotation, in particular of the rotary shaft and therefore, of the mowing unit, in particular of the blade-holding device, about the mowing-unit axis of rotation.

In one development of the invention, the lawnmower and/or the motor scythe have/has, in particular each, an, in particular the, mowing unit with the side of the parallelogram running substantially in the radial direction. The lawnmower and/or the motor scythe are/is, in particular each, designed or configured to rotate the mowing unit, in particular the blade-holding device, with the blade with the side running substantially in the radial direction at the front or forward or first or as the front side at least at times. This allows a particularly good cutting angle and therefore a particularly good cutting or mowing pattern or a particularly good cutting or mowing result. In particular, at least at times can mean at least 50% of the time.

Further advantages and aspects of the invention will become apparent from the claims and from the description of exemplary embodiments of the invention, which are explained in the following text with reference to the figures.

DETAILED DESCRIPTION OF THE DRAWINGS

Figure 1:
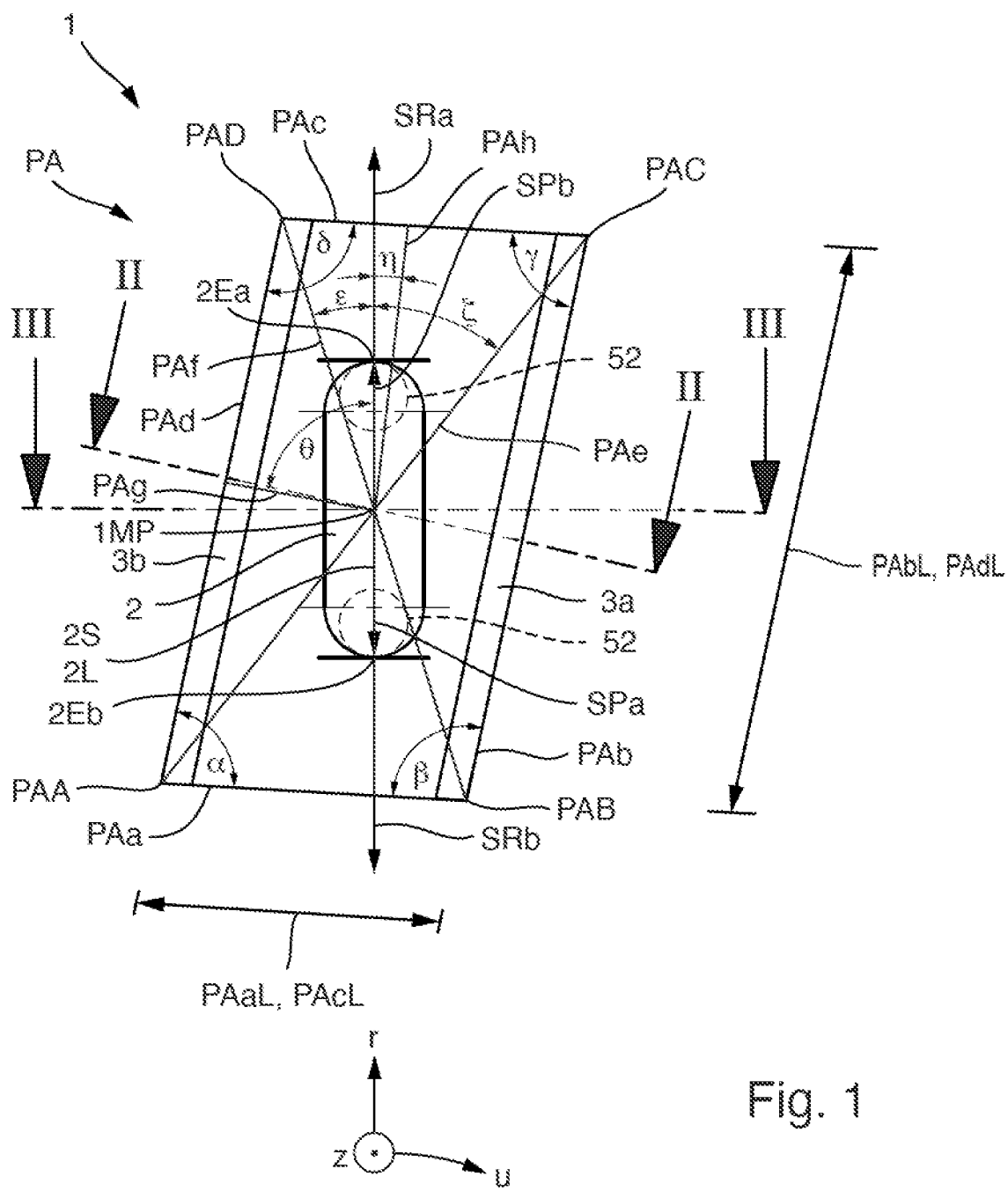
FIG. 1 shows a plan view of a blade according to an embodiment of the invention for a mowing unit for a lawnmower and/or a motor scythe.
Figure 2:
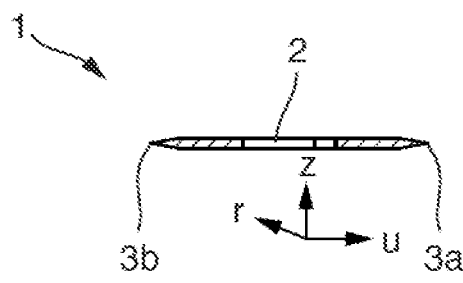
FIG. 2 shows a view in cross section of the blade in FIG. 1 along the section plane II-II.
Figure 3:
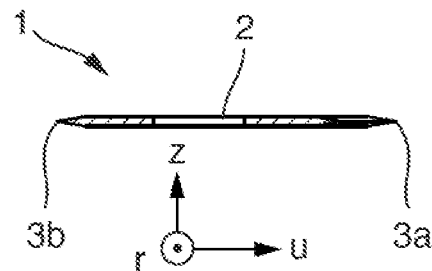
FIG. 3 shows a further view in cross section of the blade in FIG. 1 along the further section plane III-III.
Figure 4:
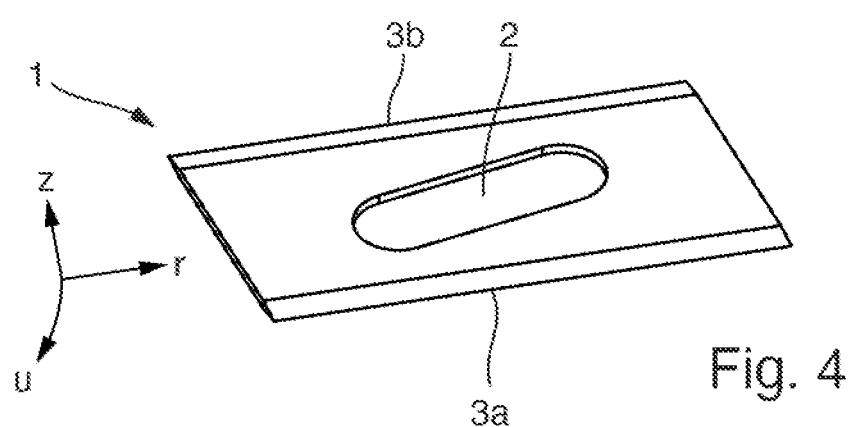
FIG. 4 shows a perspective view of the blade in FIG. 1 from above.
Figure 5:
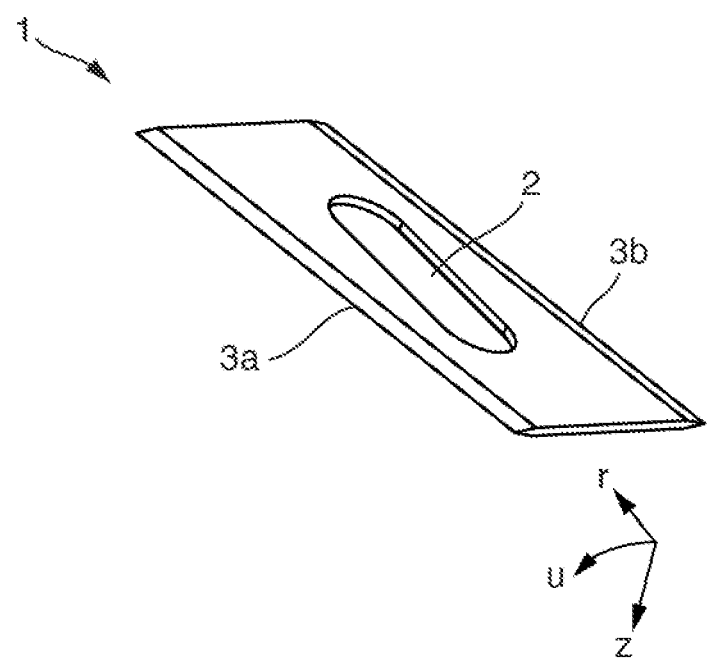
FIG. 5 shows a further perspective view of the blade in FIG. 1 from below.

FIGS. 1 to 8 show a blade 1 for a mowing unit 50 for a lawnmower 100 and/or a motor scythe 200. The blade 1 is substantially parallelogram-shaped, in particular in a plane and/or in the, in particular substantially horizontal, directions r, u, in particular a radial direction r and a direction of rotation u. The blade 1 has a slot 2. The slot 2 is designed to receive a blade-holding element 52 of the mowing unit 50 such that the blade 1 can rotate about the blade-holding element 52 and move in translation with respect to the blade-holding element 52 for one cutting position SPa of the blade 1 defined by one end 2Ea of the slot 2 having one cutting orientation SRa of the blade 1 and another cutting position SPb of the blade 1 defined by another end 2Eb of the slot 2 having another cutting orientation SRb of the blade 1. A line segment 2S delimited by the ends 2Ea, 2Eb of the slot 2 does run non-parallel to sides PAa, PAb, PAc, PAd of the parallelogram PA. The parallelogram PA has an obtuse internal angle β, δ.

In particular, substantially horizontal can mean a deviation, in particular an angular deviation, with respect to a, in particular the, horizontal of at most 10°, in particular at most 5°, in particular 3°.

Specifically, the blade 1 has cutting edges 3a, 3b on at least two opposite, in particular long, sides PAb, PAd of the parallelogram PA. In particular, the slot 2 is designed such that the blade 1 can cut with one of the cutting edges 3a with the one cutting orientation SRa and with another of the cutting edges 3b with the other cutting orientation SRb.

Furthermore, the slot 2 is straight.

Moreover, the slot 2 is designed such that the cutting orientations SRa, SRb of the blade 1 are rotated, in particular through substantially 180°, with respect to one another.

Furthermore, the line segment 2S, in particular the slot 2, runs through a center of mass IMP of the blade 1.

In addition, the line segment 2S, in particular the slot 2, runs with point symmetry and/or twofold rotational symmetry in the blade 1.

Furthermore, the ends 2Ea, 2Eb of the slot 2 are each closer to a respective corner PAB, PAD of a minor diagonal PAf of the parallelogram PA than to corners PAA, PAC of a major diagonal PAe of the parallelogram PA.

In addition or alternatively, a minor-diagonal angle ε between the line segment 2S and the minor diagonal PAf of the parallelogram PA is smaller than a major-diagonal angle ζ between the line segment 2S and the major diagonal PAe of the parallelogram PA.

In addition or alternatively, the line segment 2S runs between the minor diagonal PAf of the parallelogram PA and the major diagonal PAe of the parallelogram PA.

Moreover, adjacent sides PAa, PAb, PAc, PAd of the parallelogram PA are different lengths. In particular, a short-orthogonal angle η between the line segment 2S and a short orthogonal PAh orthogonal to the short sides PAa, PAc of the parallelogram PA is smaller than a long-orthogonal angle θ between the line segment 2S and a long orthogonal PAg orthogonal to the long sides PAb, PAd of the parallelogram PA.

Specifically, the long sides PAb, PAd of the parallelogram PA have a length PAbL, PAdL of at least 20 mm and/or at most 160 mm, in particular 40 mm.

In addition or alternatively, the short sides PAa, PAc of the parallelogram PA have a length PAaL, PAcL of at least 10 mm and/or at most 80 mm, in particular 20 mm.

In addition or alternatively, the slot 2 has a length 2L of at least 7.5 mm and/or at most 30 mm, in particular 15 mm.

In addition or alternatively, the obtuse internal angle β, δ is at least 95° and/or at most 120°, in particular 100°.

In addition or alternatively, the minor-diagonal angle ε between the line segment 2S and the minor diagonal PAf of the parallelogram PA is at least 10° and/or at most 40°, in particular 20°.

In addition or alternatively, the major-diagonal angle ζ between the line segment 2S and the major diagonal PAe of the parallelogram PA is at least 15° and/or at most 75°, in particular 37.5°.

In addition or alternatively, the short-orthogonal angle η between the line segment 2S and the short orthogonal PAh orthogonal to the short sides PAa, PAc of the parallelogram PA is at least 2.5° and/or at most 10°, in particular 5°.

In addition or alternatively, the long-orthogonal angle θ between the line segment 2S and the long orthogonal PAg orthogonal to long sides PAb, PAd of the parallelogram PA is at least 70° and/or at most 85°, in particular 80°.

Figure 6:
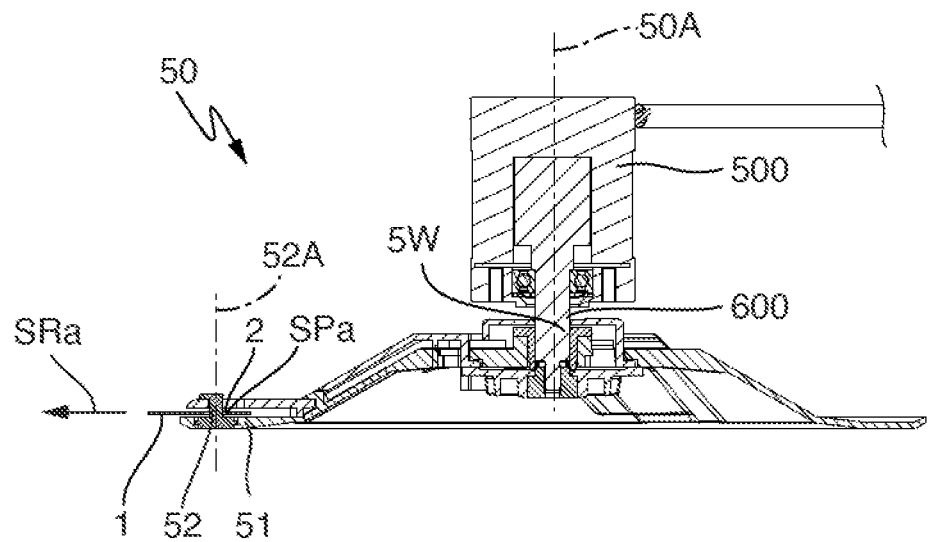
FIG. 6 shows a view in longitudinal section of a mowing unit according to the invention for a lawnmower and/or a motor scythe having the blade in FIG. 1.
Figure 8:
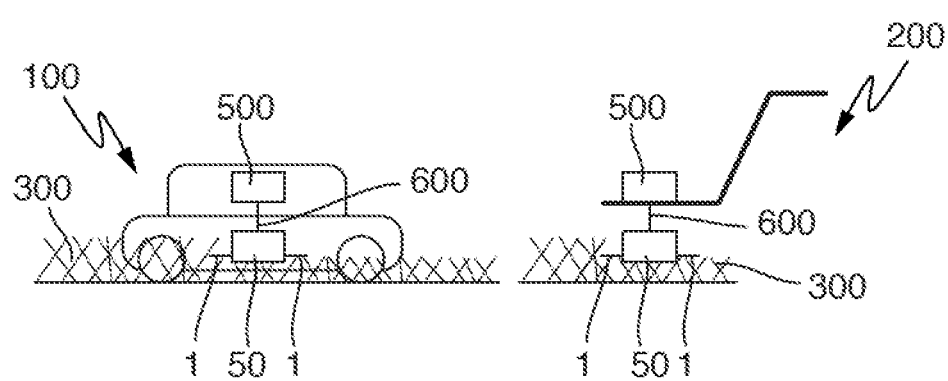
FIG. 8 shows a schematic view of a lawnmower according to the invention and of a motor scythe according to the invention having the mowing unit in FIG. 6.
Figure 7:
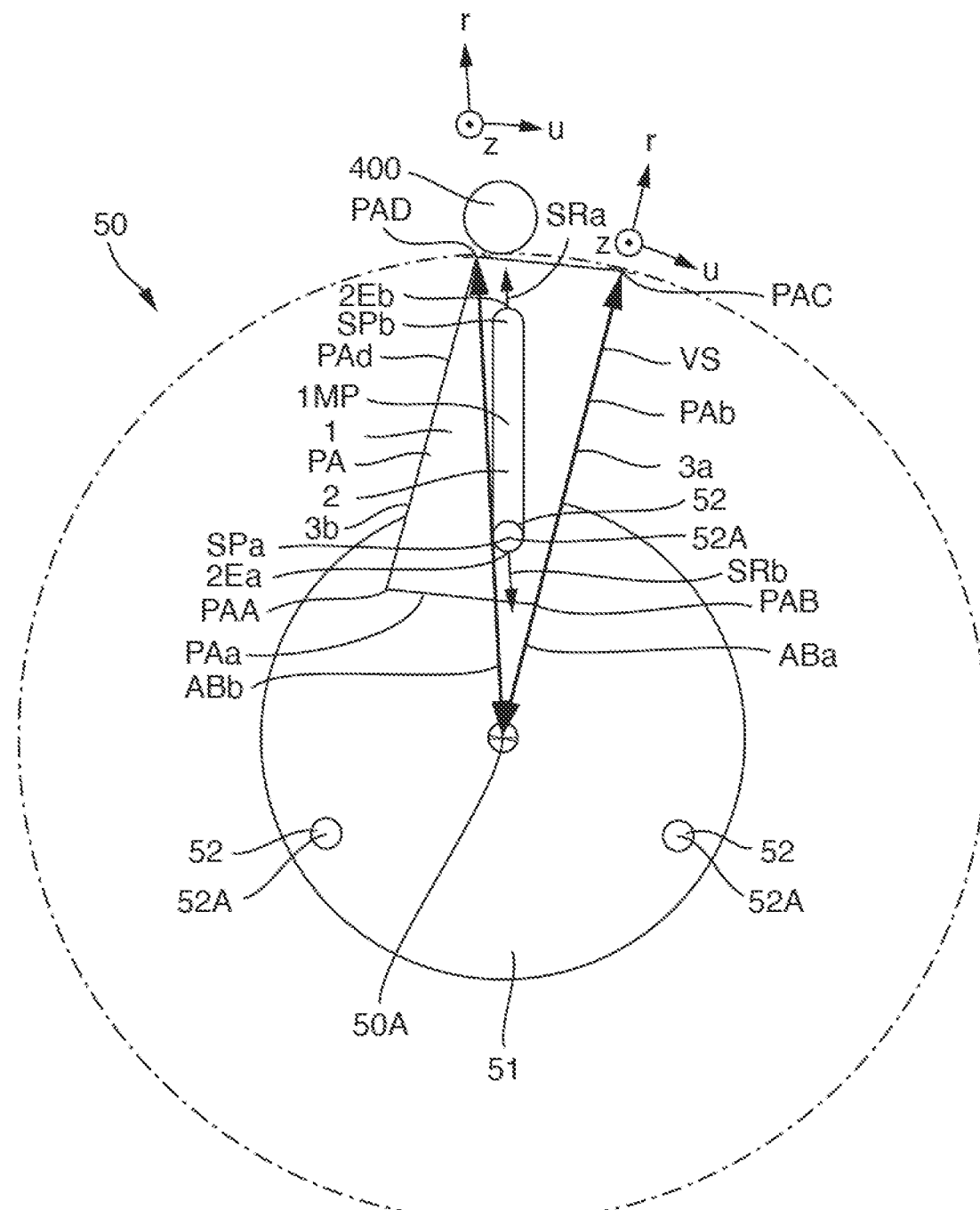
FIG. 7 shows a schematic plan view of the mowing unit in FIG. 6.

FIGS. 6 to 8 show the mowing unit 50 for the lawnmower 100 and/or the motor scythe 200. The mowing unit 50 has at least the blade 1 and a blade-holding device 51. The blade-holding device 51 has at least the blade-holding element 52 for holding the blade 1. The blade-holding device 51 is designed to rotate about an, in particular substantially vertical, mowing-unit axis of rotation 50A of the mowing unit 50, in particular in the direction of rotation u.

In particular, substantially vertical can mean a deviation, in particular an angular deviation, with respect to an, in particular the, vertical, of at most 10°, in particular at most 5°, in particular 3°.

In the exemplary embodiment shown, the mowing unit 50 has three blades 1 and the blade-holding device 51 has three blade-holding elements 52. In alternative exemplary embodiments, the mowing unit may have only a single blade or two or at least four blades. In addition or alternatively, in alternative exemplary embodiments, the blade-holding device can have only a single blade-holding element or two or at least four blade-holding elements.

In particular, the blades 3 and/or the blade-holding element 52 are arranged in particular regularly, in particular equidistantly, in particular equidistantly at 120°, about the mowing-unit axis of rotation 50A, in particular in the direction of rotation u.

Furthermore, the slot 2 has received the blade-holding element 52 for holding the blade 1 by way of the blade-holding element 52.

In the exemplary embodiment shown, the blade-holding element 52 and the slot 2 of the blade 1 are designed to receive the blade-holding element 52 parallel to an, in particular substantially vertical, element longitudinal axis 52A of the blade-holding element 52.

Specifically, the blade-holding element 52 is arranged in a manner spaced apart from the mowing-unit axis of rotation 50A in the radial direction r orthogonal to the mowing-unit axis of rotation 50A.

In addition, the parallelogram PA is formed in such a way and the ends 2Ea, 2Eb of the slot 2 are arranged in the blade 1 in such a way, in particular and the blade-holding element 52 is arranged in such a way, that during holding by the blade-holding element 52 and during rotation of the mowing unit 50, the mowing-unit axis of rotation 50A has substantially equal spacings ABa, ABb from two respective remote corners PAC, PAD, PAA, PAB, in particular of the short side PAc, PAa, of the parallelogram PA in the one cutting position SPa of the blade 1 having the one cutting orientation SRa of the blade 1 and/or in the other cutting position SPb of the blade 1 having the other cutting orientation SRb of the blade 1, as shown in FIG. 7 for the corners PAC, PAD, in particular of the short side PAc, of the parallelogram PA in the one cutting position SPa of the blade 1 having the one cutting orientation SRa of the blade 1. In particular, the spacings ABa, ABb are at least 80 mm and/or at most 640 mm, in particular 140 mm.

Furthermore, the parallelogram PA is formed in such a way and the ends 2Ea, 2Eb of the slot 2 are arranged in the blade 1 in such a way, in particular and the blade-holding element 52 is arranged in such a way, that during holding by the blade-holding element 52 and during rotation of the mowing unit 50, an, in particular the long, side PAb, PAd of the parallelogram PA runs substantially in the radial direction r orthogonal to the mowing-unit axis of rotation 50A in the one cutting position SPa of the blade 1 having the one cutting orientation SRa of the blade 1 and/or in the other cutting position SPb of the blade 1 having the other cutting orientation SRb of the blade 1, as shown in FIG. 7 for the long side PAb of the parallelogram PA in the one cutting position SPa of the blade 1 having the one cutting orientation SRa of the blade 1.

FIG. 8 shows the lawnmower 100, in particular in the form of a robotic lawnmower, and/or the motor scythe 200. The lawnmower 100 and/or the motor scythe 200 have/has the mowing unit 50.

Specifically, the lawnmower 100 and/or the motor scythe 200 have/has the mowing unit 50 with the side PAb, PAd of the parallelogram PA running substantially in the radial direction r. The lawnmower 100 and/or the motor scythe 200 are/is designed to rotate the mowing unit 50 with the blade 1 with the side PAb, PAd running substantially in the radial direction r at the front or as the front side VS at least at times, as shown in FIG. 7 for the long side PAb of the parallelogram PA in the one cutting position SPa of the blade 1 having the one cutting orientation SRa of the blade 1.

In the exemplary embodiment shown, the lawnmower 100 and/or the motor scythe 200 have/has a rotary shaft 600. In particular, the rotary shaft 600 is designed to rotate, and in particular rotates, about the mowing-unit axis of rotation 50A.

The mowing unit 50, in particular the blade-holding device 51, has a shaft receptacle 5W for receiving the rotary shaft 600, in particular in an axial direction z that is not orthogonal, in particular parallel, in particular substantially vertical, with respect to the mowing-unit axis of rotation 50A, and in particular, the shaft receptacle 5W has received the rotary shaft 60.

Moreover, the lawnmower 100 and/or the motor scythe 200 have/has a drive motor 500 for driving the rotation, in particular of the rotary shaft 600 and therefore, of the mowing unit 50, in particular of the blade-holding device 51, about the mowing-unit axis of rotation 50A.

In particular, the lawnmower 100 and/or the motor scythe 200 rotate/rotates the mowing unit 50, in particular with the blade 1 with the side PAb, PAd running substantially in the radial direction r at the front or as the front side VS, as shown in FIG. 7 for the long side PAb of the parallelogram PA in the one cutting position SPa of the blade 1 having the one cutting orientation SRa of the blade 1.

In particular therefore, the blade-holding device 51 rotates about the mowing-unit axis of rotation 50A of the mowing unit 50.

In particular therefore, the blade 1 moves in translation, in particular has been moved in translation, in particular with respect to the blade-holding element 52, into the one cutting position SPa, and rotates, in particular has been rotated, in particular about the blade-holding element 52, into the one cutting orientation SRa, as shown in FIGS. 6 and 7, or moves in translation, in particular has been moved in translation, in particular with respect to the blade-holding element 52, into the other cutting position SPb, and rotates, in particular has been rotated, in particular about the blade-holding element 52, into the other cutting orientation SRb.

In particular in this case, the blade-holding element 52 holds the blade 1, in particular at the one end 2Ea of the slot 2 or at the other end 2Eb of the slot 2.

In particular therefore, the blade 1 cuts in particular with the one cutting edge 3a with the one cutting orientation SRa, as shown in FIG. 7, or with the other cutting edge 3b with the other cutting orientation SRb, in particular grass 300, as shown in FIG. 8.

If the blade 1 meets an obstacle 400, the blade 1 moves away from or yields to the obstacle 400, in particular as a result of the rotation and the movement in translation.

Temporally after meeting, in particular and moving away or yielding, the blade 1 moves in translation into the one cutting position SPa and rotates into the one cutting orientation SRa or moves in translation into the other cutting position SPb and rotates into the other cutting orientation SRb.

In the exemplary embodiment shown, the blade-holding element 52 is designed to hold, in particular holds, the blade 1 by way of a form-fitting connection and/or counter to releasing in and/or counter to the radial direction r, in particular and the direction of rotation u, in particular from the blade-holding element 52.

Furthermore, the blade-holding device 51 is designed to hold, in particular holds, the blade 1 by way of a form-fitting connection and/or counter to releasing in and/or counter to the axial direction z, in particular from the blade-holding device 51.

In addition, the blade 1 scarcely runs or stretches in the axial direction z, in particular compared with the radial direction r and/or the direction of rotation u.

In addition or alternatively, the blade 1 is substantially or approximately, in particular exactly, mirror symmetric with respect to an, in particular the, plane, in particular section plane, in particular longitudinal section plane, orthogonal or normal to the axial direction z.

As the exemplary embodiments shown and described above make clear, the invention provides an advantageous blade for a mowing unit for a lawnmower and/or a motor scythe, an advantageous mowing unit for a lawnmower and/or a motor scythe having at least one such blade, and an advantageous lawnmower and/or an advantageous motor scythe having such a mowing unit, this/these having the respectively improved properties.

What is claimed is:

1. A blade for a mowing unit for a lawnmower and/or a motor scythe, comprising:
    a substantially parallelogram-shaped blade;
    wherein the blade has a slot,
        wherein the slot is designed to receive a blade-holding element of the mowing unit such that the blade is rotatable about the blade-holding element and movable in translation relative to the blade-holding element for one cutting position of the blade defined by one end of the slot having one cutting orientation of the blade and another cutting position of the blade defined by another end of the slot having another cutting orientation of the blade,
    wherein a line segment delimited by the one and another ends of the slot does run non-parallel to sides of the parallelogram,
    wherein the parallelogram has an obtuse internal angle, and
    wherein at least one of:
        the ends of the slot are each closer to a respective corner of a minor diagonal of the parallelogram than to corners of a major diagonal of the parallelogram, or
        a minor-diagonal angle between the line segment and the minor diagonal of the parallelogram is smaller than a major-diagonal angle between the line segment and the major diagonal of the parallelogram.

2. The blade according to claim 1,
    wherein the blade has cutting edges at at least two opposite sides of the parallelogram, and
    wherein the slot is designed such that the blade can cut with one of the cutting edges with the one cutting orientation and can cut with another of the cutting edges with the other cutting orientation.

3. The blade according to claim 2,
    wherein the at least two opposite sides are long sides of the parallelogram.

4. The blade according to claim 1,
    wherein the slot is straight.

5. The blade according to claim 1,
    wherein the slot is designed such that the cutting orientations of the blade are rotated with respect to one another.

6. The blade according to claim 5,
    wherein the cutting orientations are rotated through substantially 180° with respect to one another.

7. The blade according to claim 1,
    wherein the line segment runs through a center of mass of the blade.

8. The blade according to claim 1,
    wherein the line segment runs with point symmetry and/or twofold rotational symmetry in the blade.

9. The blade according to claim 1, wherein the line segment runs between the minor diagonal of the parallelogram and the major diagonal of the parallelogram.

10. The blade according to claim 1,
    wherein adjacent sides of the parallelogram have different lengths.

11. The blade according to claim 10,
    wherein a short-orthogonal angle between the line segment and a short orthogonal orthogonal to short sides of the parallelogram is smaller than a long-orthogonal angle between the line segment and a long orthogonal orthogonal to long sides of the parallelogram.

12. The blade according to claim 1, wherein at least one of:
    long sides of the parallelogram have a length of at least 20 mm or at most 160 mm,
    short sides of the parallelogram have a length of at least 10 mm or at most 80 mm,
    the slot has a length of at least 7.5 mm or at most 30 mm,
    the obtuse internal angle is at least 95° or at most 120°,
    a minor-diagonal angle between the line segment and a minor diagonal of the parallelogram is at least 10° or at most 40°, a major-diagonal angle between the line segment and a major diagonal of the parallelogram is at least 15° or at most 75°, a short-orthogonal angle between the line segment and a short orthogonal orthogonal to short sides of the parallelogram is at least 2.5° or at most 10°, or a long-orthogonal angle between the line segment and a long orthogonal orthogonal to long sides of the parallelogram is at least 70° or at most 85°.

13. A mowing unit for a lawnmower and/or a motor scythe, comprising:
    at one blade according to claim 1; and
    a blade-holding device, wherein
        the blade-holding device has at least one blade-holding element for holding the at least one blade, and
        the blade-holding device is designed to rotate about a mowing-unit axis of rotation of the mowing unit.

14. The mowing unit according to claim 13, wherein the blade-holding element is arranged in a manner spaced apart from the mowing-unit axis of rotation in a radial direction orthogonal to the mowing-unit axis of rotation.

15. The mowing unit according to claim 13, wherein the parallelogram is formed in such a way and the ends of the slot are arranged in the blade in such a way that during holding by the blade-holding element and during rotation of the mowing unit, the mowing-unit axis of rotation has substantially equal spacings from two respective remote corners of the parallelogram in the one cutting position of the blade having the one cutting orientation of the blade and/or in the other cutting position of the blade having the other cutting orientation of the blade, and wherein the spacings are at least 80 mm or at most 640 mm.

16. The mowing unit according to claim 13, wherein the parallelogram is formed in such a way and the ends of the slot are arranged in the blade in such a way that during holding by the blade-holding element and during rotation of the mowing unit, a long side of the parallelogram runs substantially in a radial direction orthogonal to the mowing-unit axis of rotation in the one cutting position of the blade having the one cutting orientation of the blade and/or in the other cutting position of the blade having the other cutting orientation of the blade.

17. A lawnmower and/or motor scythe comprising a mowing unit according to claim 13.

18. The lawnmower and/or motor scythe according to claim 17, wherein the parallelogram is formed in such a way and the ends of the slot are arranged in the blade in such a way that during holding by the blade-holding element and during rotation of the mowing unit, a long side of the parallelogram runs substantially in a radial direction orthogonal to the mowing-unit axis of rotation in the one cutting position of the blade having the one cutting orientation of the blade and/or in the other cutting position of the blade having the other cutting orientation of the blade, and wherein the lawnmower and/or the motor scythe are/is designed to rotate the mowing unit with the blade with the side running substantially in the radial direction at the front at least at times.

19. A blade for a mowing unit for a lawnmower and/or a motor scythe, comprising:
    a substantially parallelogram-shaped blade;
    wherein the blade has a slot,
        wherein the slot is designed to receive a blade-holding element of the mowing unit such that the blade is rotatable about the blade-holding element and movable in translation relative to the blade-holding element for one cutting position of the blade defined by one end of the slot having one cutting orientation of the blade and another cutting position of the blade defined by another end of the slot having another cutting orientation of the blade,
        wherein a line segment delimited by the one and another ends of the slot does run non-parallel to sides of the parallelogram,
        wherein the parallelogram has an obtuse internal angle,
        wherein the obtuse internal angle is at least 95° and at most 120°, and
    wherein at least one of:
        the ends of the slot are each closer to a respective corner of a minor diagonal of the parallelogram than to corners of a major diagonal of the parallelogram, or
        a minor-diagonal angle between the line segment and the minor diagonal of the parallelogram is smaller than a major-diagonal angle between the line segment and the major diagonal of the parallelogram.

20. A mowing unit for a lawnmower and/or a motor scythe, comprising:
    at least one blade comprising a substantially parallelogram-shaped blade,
        wherein the blade has a slot,
        wherein the slot is designed to receive a blade-holding element of the mowing unit such that the blade is rotatable about the blade-holding element and movable in translation relative to the blade-holding element for one cutting position of the blade defined by one end of the slot having one cutting orientation of the blade and another cutting position of the blade defined by another end of the slot having another cutting orientation of the blade,
        wherein a line segment delimited by the one and another ends of the slot does run non-parallel to sides of the parallelogram, and
        wherein the parallelogram has an obtuse internal angle; and
    a blade-holding device, wherein
        the blade-holding device has at least one blade-holding element for holding the blade, and,
        the blade-holding device is designed to rotate about a mowing-unit axis of rotation of the mowing unit,
    wherein the parallelogram is formed in such a way and the ends of the slot are arranged in the blade so that during holding by the blade-holding element and during rotation of the mowing unit, the mowing-unit axis of rotation has substantially equal spacings from two respective remote corners of the parallelogram in the one cutting position of the blade having the one cutting orientation of the blade and/or in the other cutting position of the blade having the other cutting orientation of the blade,
    wherein the substantially equal spacings means a length deviation of at most 2.5%.

* * * * *